Patented May 5, 1953

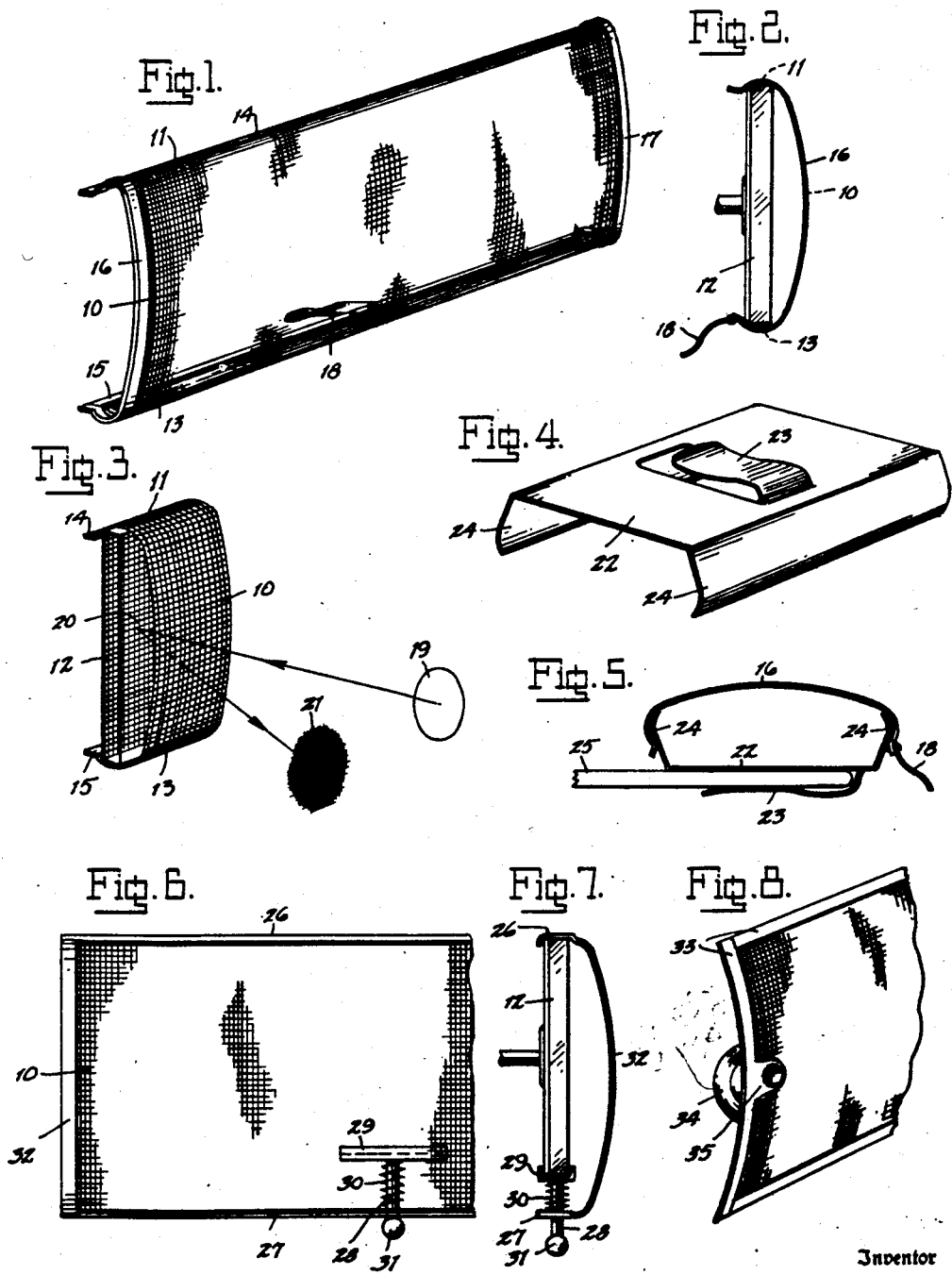

2,637,246

UNITED STATES PATENT OFFICE 2,637,246

GLARE SHIELD FOR REAR VISION AUTOMOBILE MIRRORS

Joseph Wolk, Trumbull, Conn.

Application December 20, 1949, Serial No. 133,979

1 Claim. (Cl. 88—77)

The present invention relates to a glare shield for rear vision automobile mirrors, and has for an object to provide a device of this character of simple and inexpensive construction, which may be easily attached to the mirror, and also readily removed when the use of the shield is not required.

As is well known the reflection in the rear vision mirror of headlights of following automobiles is ordinarily so concentrated in the mirror that the driver's vision is materially affected, in fact, sometimes blinded, so that driving under such conditions is extremely dangerous. While shields of a translucent material such as Celluloid have been employed for this purpose, these have not been entirely satisfactory because, if they are of such density as to sufficiently reduce the glare of the headlights, they also impair the view of the road.

It is proposed in the present invention to provide a glare shield in the form of a wire mesh having relatively large mesh openings, and adapted to be mounted in spaced relation to the mirror surface, the mesh openings being of sufficient size so that the reflected image in the mirror of the road is not materially impaired. In the case of the reflection of headlights the wire mesh shield will function to break up the reflected image of the headlight in the mirror in correspondence with the separation of the mesh openings by the woven wire of the shield, and the view of the reflected image in the mirror, as seen by the eye of the driver along a line at an angle to the line between the headlight and the mirror, will be intercepted by the wire mesh shield, so that the image as seen by the driver will be broken up into still smaller parts, which may be said to be in the order of an image seen directly through a shield having mesh openings representing a fraction of the size of the mesh openings of the actual wire mesh shield employed. Thus the glare from headlights is effectually reduced and at the same time the view of the road in the mirror is not reduced to the point where it is not clearly visible. The slight vibration that may take place between the wire mesh shield and the mirror during movement of the automobile also lends to the further breaking up of the image as seen by the driver.

I am aware that wire mesh glare shields have heretofore been employed on windshields for reducing the glare of the lights of approaching cars, but in this case the headlight is seen directly through the screen so that unless a very fine mesh shield is employed the reduction in glare is not sufficient to prevent blinding the driver. Such a fine mesh shield would not allow a clear vision of the road through it.

A further object of the invention is to provide a glare shield formed of wire mesh screen and in which the inherent springiness of the screen material is employed for yieldably retaining the shield upon the mirror. Another object is to provide a wire mesh glare shield of curved form which, in relation to the flat mirror, tends to further reduce the glare of the reflected image as seen by the driver. A still further object is to provide in combination with the glare shield a support adapted to be attached to the sun visor or similar part of the automobile within easy reach of the driver, and upon which the glare shield can be mounted when not in use upon the mirror.

With the above and other objects in view, embodiments of the invention are shown in the accompanying drawings, and these embodiments will be hereinafter more fully described with reference thereto, and the invention will be finally pointed out in the claim.

In the drawings:

Fig. 1 is a perspective view of the glare shield for rear vision mirrors, according to one exemplary embodiment of the invention.

Fig. 2 is an end view showing the shield attached to the rear vision mirror.

Fig. 3 is a diagrammatic perspective view showing the manner in which the reflected image of a headlight is seen by the eye of the driver.

Fig. 4 is a perspective view of the mounting member for supporting the glare shield when not in use upon the mirror.

Fig. 5 is an end view showing the mounting member and the glare shield supported upon the sun visor of the automobile.

Fig. 6 is a front elevation, partially broken away, of a modified form of the invention.

Fig. 7 is an end view showing the glare shield illustrated in Fig. 6 attached to a mirror.

Fig. 8 is a perspective view, partially broken away, of another modified form of the invention.

Similar reference characters indicate corresponding parts throughout the several figures of the drawings.

Referring to the drawings and more particularly to the Figs. 1 to 3 thereof, the glare shield, according to the exemplary embodiment of the invention illustrated therein, comprises a wire mesh member 10 of generally rectangular shape and having relatively large mesh openings, the wire mesh being preferably of the order about 30 warp and 30 weft wires to the square inch. It has been found that a mesh opening of this size is sufficiently large so that the reflected view of the road in the mirror can be seen clearly and, at the same time, because of the cooperative relation between the wire mesh shield and the mirror, the glare of following headlights is greatly reduced as will be hereinafter more fully pointed out. The term "wire mesh" as employed herein is intended to apply to metal, plastic or other suitable wire mesh material, as well as to any equivalent light perforate structure, whether woven or otherwise formed.

The wire mesh member is convexly curved outwardly between its upper and lower edges and extends straight between its end edges, the upper marginal portion being curved, as at 11, to embrace the upper edge of the rear vision mirror 12, and the lower marginal portion being curved, as at 13, to embrace the lower edge of the mirror. The edges of the wire are enclosed for protection in a suitable framing means, the upper and lower edges being enclosed in relatively stiff binding strips 14 and 15, preferably formed of metal channel strips compressed about the edges, and the end edges being enclosed in binding strips 16 and 17 which are flexible to permit flexing of the shield as it is engaged and disengaged with the mirror. These end binding strips are preferably formed of molded rubber, plastic material, spring metal, or any suitable substance capable of resilient flexing.

Due to the inherent springiness of the wire mesh member 10 and the end binding strips 16 and 17, the longitudinal edges of the glare shield may be sprung apart to engage the curved portions 11 and 13 over the upper and lower edges of the mirror, and the shield will then contract into gripping engagement with the mirror under the inherent spring pressure of the shield. Upon the lower edge strip 15 there is provided a cenrally positioned handle 18 to facilitate engagement with and disengagement from the mirror.

Thus it will be seen that when the glare shield is in place upon the mirror it is in spaced relation to the mirror surface and is convexly curved outwardly between the upper and lower edges. As shown diagrammatically in Fig. 3 the image of a following headlight 19 is intercepted by the screen, so that the reflection in the mirror is in the form of the reflection of the headlight superimposed by the reflection of the wire mesh, as seen at 20. The line of vision to the eye of the driver in viewing the image in the mirror through the wire mesh is at an angle to the line of incidence between the headlight and the mirror, so that the driver sees not only the wire mesh but also the image of the wire mesh behind it. Thus, the image of the reflected headlight, as seen by the eye, is substantially as shown at 21 wherein the dark lines indicate the screen as directly seen and the light lines indicate the image in the mirror. As these lines will not be superimposed upon each other, due both to the angle of the line of vision and to the fact that there is always some relative movement between the mirror, the glare shield, and the eye of the driver, the image as seen greatly multiplies the mesh openings with the result that the reflected headlight glare is broken up into very fine parts and effectually reduced.

In Figs. 4 and 5 there is shown a mounting member 22 for the convenient supporting of the glare shield when it is not in use upon the mirror, this mounting member being constructed of sheet metal, molded plastic material or the like, and having a spring clip 23 lanced and bent therefrom to enable it to be clipped upon the edge of the sun visor or the like 24. At each longitudinal edge of the mounting there is provided an angularly extending rounded flange 24 upon which the glare shield may be clipped in substantially the same way that it is clipped to the mirror, the handle 18 projecting from the edge of the sun visor 25, so that it may be readily found in the dark.

In Figs. 6 and 7 there is shown a modified form of the invention in which the wire mesh member 10 is provided at its upper edge with a grooved frame member 26, adapted to engage the upper edge of the mirror 12, and is provided at its lower edge with a frame strip 27 supporting the shank 28 of a grooved clamp member 29 adapted to engage the lower edge of the mirror, a spring 30 being provided upon the shank between the strip 27 and the clamp member 29 to normally press the clamp member upwardly. Upon the lower end of the shank 28 there is provided a knob portion 31 which limits the upward movement of the clamp member under the pressure of the spring and enables it to be pulled downwardly to engage or disengage the shield with the mirror. In this form of the invention the end strips 32 of the frame are preferably rigid, as distinguished from the flexible strips 16 and 17 of the first embodiment of the invention.

In Fig. 8 there is shown a further modified form of the invention in which the convexly curved wire mesh member 10 is provided with a rectangular frame 33, to each of the end strips of which there is centrally secured a rubber suction cup 34 mounted in an inwardly extending lug portion 35 of the end strip. The shield is attached to the mirror simply by pressing the suction cup at each end against the surface of the mirror. As the suction cups resiliently support the shield out of contact with the mirror surface, the relative vibration between the screen and the mirror during movement of the car is substantially increased, thus increasing the glare reducing effect.

I have illustrated and described preferred and satisfactory embodiments of the invention, but it will be understood that changes may be made therein, within the spirit and scope thereof, as defined in the appended claim.

What is claimed is:

A glare shield for mounting upon a rear vision automobile mirror of rectangular form, comprising a rectangular piece of inherently resilient wire mesh of a size to substantially cover the vision side of the mirror, said piece of wire mesh being of generally C-form in vertical transverse section and being straight longitudinally whereby it has vertically opposed marginal channel portions at its longitudinal edges and is convexly curved outwardly between said channel portions, a rectangular frame engaged about the edges of said wire mesh and comprising relativelly stiff straight longitudinal portions engaged with the longitudinal edges of said wire mesh along their entire lengths for disposition at the rearward side of said mirror inwardly of its longitudinal edges, and resiliently flexible transverse portions of generally C-shape engaged with the end edges along their entire lengths and secured at their ends to the ends of said longitudinal portions, said transverse portions being provided at their upper and lower ends with vertically opposed channel portions conforming to said channel portions of said wire mesh for engagement about the upper and lower edges of said mirror and being convexly curved intermediate said channel portions in conformity to the convex curvature of said wire mesh, and whereby said channel portions of said transverse portions and of said wire mesh screen are adapted through inward flexing of said transverse portions intermediate said channel portions to be sprung outwardly from each other for engagement and disengagement with respect to said mirror and are adapted to be resiliently drawn toward each other to clampingly engage with the edges of said mirror whereby the intermediate portion of said wire mesh is supported in outwardly curved spaced relation to the mirror surface.

JOSEPH WOLK.

References Cited in the file of this patent

UNITED STATES PATENTS

| Number | Name | Date |
| --- | --- | --- |
| 1,589,475 | Lowther | June 22, 1926 |
| 1,987,259 | Koehler | Jan. 8, 1935 |
| 1,990,222 | Burlein | Feb. 5, 1935 |
| 2,471,524 | Hendricks | May 31, 1949 |